United States Patent [19]
Kraft et al.

[11] Patent Number: 5,747,744
[45] Date of Patent: May 5, 1998

[54] WEIGHING DEVICE FOR THE POINT-OF-SALE OF A RETAIL OUTLET

[75] Inventors: Horst Kraft, Balingen; Horst Purr, Tennenbronn; Edgar Engelhardt, Balingen, all of Germany

[73] Assignee: Bizerba GmbH & Co. KG, Balingen, Germany

[21] Appl. No.: 557,123

[22] PCT Filed: Jun. 8, 1994

[86] PCT No.: PCT/EP94/01872

§ 371 Date: Dec. 11, 1995

§ 102(e) Date: Dec. 11, 1995

[30] Foreign Application Priority Data

Jun. 10, 1993 [DE] Germany ............... 43 19 299.8

[51] Int. Cl.⁶ .................. G01G 19/40; G01G 21/22
[52] U.S. Cl. ............ 177/25.15; 177/253; 177/262; 177/184
[58] Field of Search ............... 177/25.15, 262, 177/229, 244, 253, 245, 184

[56] References Cited

U.S. PATENT DOCUMENTS

| | | | |
|---|---|---|---|
| 3,985,190 | 10/1976 | Kammerer et al. | 177/184 |
| 4,513,831 | 4/1985 | Lee et al. | 177/184 X |
| 4,700,656 | 10/1987 | Cone et al. | 177/245 |
| 4,881,606 | 11/1989 | Halfon et al. | 177/126 |
| 4,971,176 | 11/1990 | Nojiri et al. | 177/245 |
| 4,971,177 | 11/1990 | Nojiri et al. | 177/245 |
| 5,058,691 | 10/1991 | Sela | 177/253 X |
| 5,086,879 | 2/1992 | Latimer et al. | 177/25.15 X |
| 5,139,100 | 8/1992 | Brauneis | 177/25.15 |
| 5,141,064 | 8/1992 | Willemsen et al. | 177/184 |
| 5,307,281 | 4/1994 | Wollmann | 177/25.15 X |
| 5,521,334 | 5/1996 | Freeman | 177/184 X |

FOREIGN PATENT DOCUMENTS

| | | | |
|---|---|---|---|
| 0235335 | 9/1987 | European Pat. Off. | G01G 19/413 |
| 25379 | 2/1984 | Japan | G01G 19/40 |

OTHER PUBLICATIONS

Handbuch des Wagens, Kochsiek, 1989, pp. 231–232.
Technical Drawing 2-86-504-084-00A1, Sauter GmbH, Nov. 24, 1986 for KA15s weighing platform.
Debit note of Mettler-Toledo (Albstadt) GmbH of Dec. 1, 1993 for Sauter KA15s weighing platform.

*Primary Examiner*—Michael L. Gellner
*Assistant Examiner*—Randy W. Gibson
*Attorney, Agent, or Firm*—Shenier & O'Connor

[57] ABSTRACT

In a weighing device for the point-of-sale of a retail outlet with a reading device installed therein, the following measures are taken: Only a single weighing cell in the form of a bending bar is provided and as far as possible is disposed laterally offset in a stationary manner on the scales stand. The support for a load plate of the weighing device is designed to be intrinsically rigid and in the vicinity of its one edge is rigidly connected to the bending bar such that a window provided in the load plate and in the support is held cantilevered over the scales stand. On the scales stand the reading device lies on the one side and an electronic evaluation circuit lies on the other side of the bending bar. The electronic evaluation circuit with microcomputer and analog-to-digital converter carries out an automatic weight determination and price calculation of the weighed article.

14 Claims, 5 Drawing Sheets

5,747,744

WEIGHING DEVICE FOR THE POINT-OF-SALE OF A RETAIL OUTLET

BACKGROUND OF THE INVENTION

1. Field of the Invention

The invention relates to a weighing device for the point-of-sale of a retail outlet having a scales stand, a load plate for receiving an article to be weighed, a support supporting the load plate, a through-window in the load plate and in the support, a radiolucent plate covering the window, a reading device disposed beneath the plate on the scales stand for detecting codes on the article, a weighing cell loaded by the support, an electronic evaluation circuit for determining the weight of the article and its price, and a display for displaying the weight and the price of the article.

2. Prior Art

A device of this type is known from U.S. Pat. No. 4,881,606. In the known device the load plate is supported in the manner of a bridge on two weighing cells. The use of two weighing cells in the weighing device necessitates a relatively high space requirement, which inherently makes the device more expensive. However, the fact that with use of two weighing cells, their joint temperature compensation is difficult and is only achievable by special, in turn, expensive measures, may prove particularly disadvantageous. Reciprocal mechanical twisting of the two weighing cells via the load plate and its support may also give rise to undesired weighing errors. A limitation of the transverse force is also required to avoid weighing errors.

Moreover, the known device does not contain an electronic evaluation circuit for determining the weight and the price of the weighed article. The electrical signals supplied by the weighing cells are instead supplied to an electronic evaluation circuit which is housed at another place, for example, in the check-out or in a special housing with display. Therefore, such weighing devices cannot be calibrated and authorized by the responsible authorities like normal scales, i.e., as independent units in themselves. Calibration and authorization are only possible within the scope of the entire system, i.e., including the electronic evaluation circuit with display, etc., housed separately from the scales. However, such a calibration and authorization procedure is awkward, time-consuming and costly for all concerned.

SUMMARY OF THE INVENTION

The object of the invention is to design a generic weighing device with high error protection and small space requirement, in particular a small overall height and small external dimensions, so that a direct price calculation is possible in the weighing device itself and this device can, therefore, undergo calibration and authorization directly as a unit.

The object is achieved in accordance with the invention in that

- only a single weighing cell, preferably designed as a bending bar, is provided and as far as possible is disposed laterally offset in a stationary manner on the scales stand;
- the support is designed to be intrinsically rigid and in the vicinity of its one edge is rigidly connected on one side to the weighing cell such that its window is held cantilevered over the scales stand;
- on the scales stand the reading device lies on the one side and the electronic evaluation circuit lies on the other side of the weighing cell; and the electronic evaluation circuit with microcomputer and analog-to-digital converter carries out an automatic weight determination and price calculation of the weighed article.

BRIEF DESCRIPTION OF THE DRAWINGS

The following description of a preferred embodiment of the invention serves in conjunction with the attached drawings to explain the invention in further detail. In the drawings.

DETAILED DESCRIPTION OF THE PREFERRED EMBODIMENT

Figure 1:
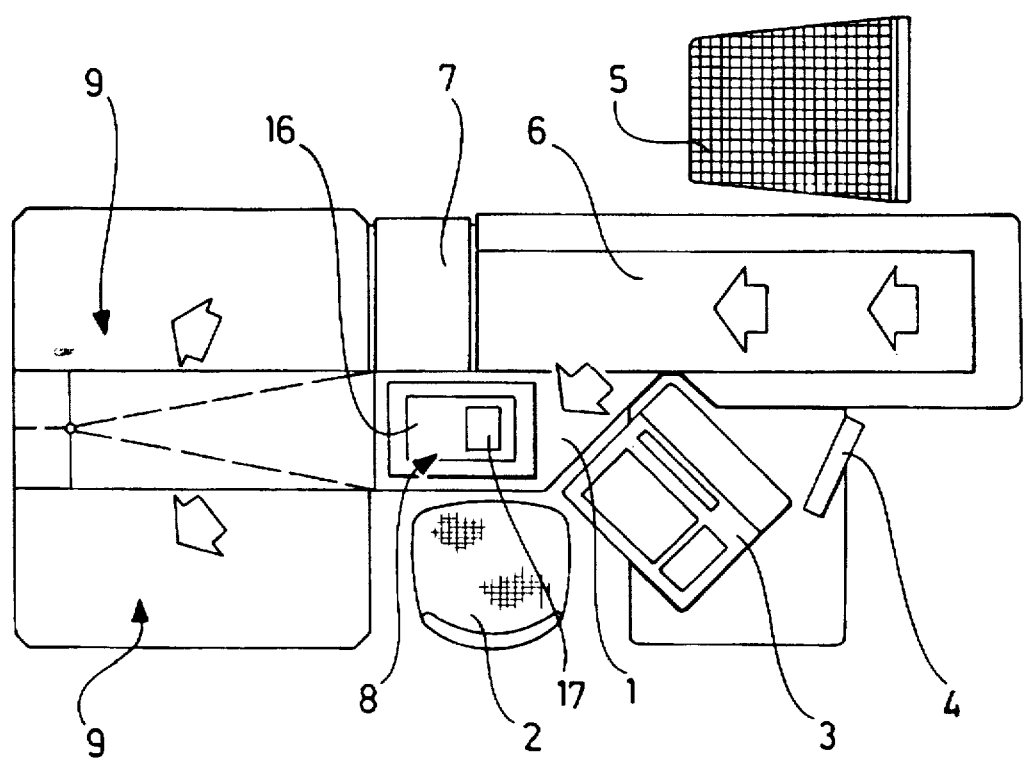
FIG. 1 shows diagrammatically in a plan view the point-of sale of a retail outlet, in particular, of a supermarket.

FIG. 1 shows diagrammatically in a plan view the point-of-sale of a large retail outlet, e.g., a supermarket or consumer market, at which a cashier ascertains and adds up the prices of the goods purchased by a customer so that the customer can then make payment for the purchased goods. Such central points-of-sale (abbreviated to POS) are normally situated at the exit of the shop, at the so-called "check-out". The purpose of such a central point-of-sale is the uniform detection and control of the turnover of goods including precautions against fraud.

The central point-of-sale represented in FIG. 1 includes a cash desk 1, in front of which a cashier is seated on a chair 2. A conventional point-of-sale terminal 3 is also associated with the cash desk 1. The calculated final prices can be seen on the display 4 of the point-of-sale terminal 3 both by the cashier and by a customer who brings the articles bought by him, for example, with a shopping basket 5, to the point-of-sale and lays them there on a conveyor belt 6 which, in turn, further transports the articles laid thereon in the direction of the arrow. A weighing device 8 having a reading device 14 disposed beneath a window 17 (FIGS. 2, 3, 4) for detecting a bar code provided on the article is also associated with the point-of-sale. The weighing device 8 is located within the reaching range of the cashier sitting on the chair 2. Articles detected by the reading device beneath the window 17 and, if appropriate, weighed by the weighing device 8 are supplied to packing areas 9, where the customer receives them after paying for the goods.

The majority of goods sold today at such points-of-sale are packaged goods, with the selling price being indicated on the packages in the form of a bar code. These goods are only scanned by the reading device 14 (scanner) located beneath the window 17, whereupon the price and the total of various prices can be brought from the point-of-sale terminal 3 to the display. However, it also happens that at central points-of-sale an article is calculated according to weight on the basis of a previously established basic price per unit of weight, for the purpose of which the cashier first has to establish the weight of this article with the weighing device 8. For this purpose, for example, the article is laid on the weighing device 8 and the cashier inputs the basic price or fetches the data from an article memory via an associated article number. The input may be performed at the point-of-sale terminal or via a keyboard (not illustrated) associated with the weighing device. From the weight and basic price the weighing device calculates the selling price and displays these data at a display 4 with compulsory calibration which can be seen by the customer and the cashier.

The stored article data may also contain an associated tare value or a tare value is input manually. In this case, the tare value is also displayed.

All data displayed in the display 4 are transmitted for each weighed article from the weighing device 8 to the point-of-sale terminal 3 for further processing, in particular, for establishing the customer total.

Figure 2:
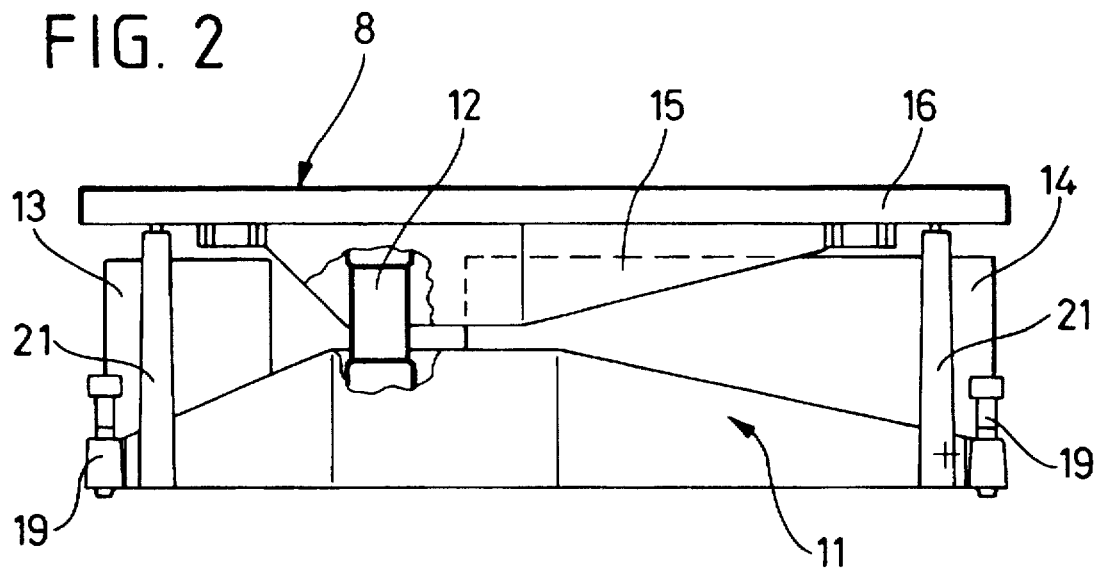
FIG. 2 shows diagrammatically a side view of a weighing device for the point-of-sale from FIG. 1.
Figure 3:
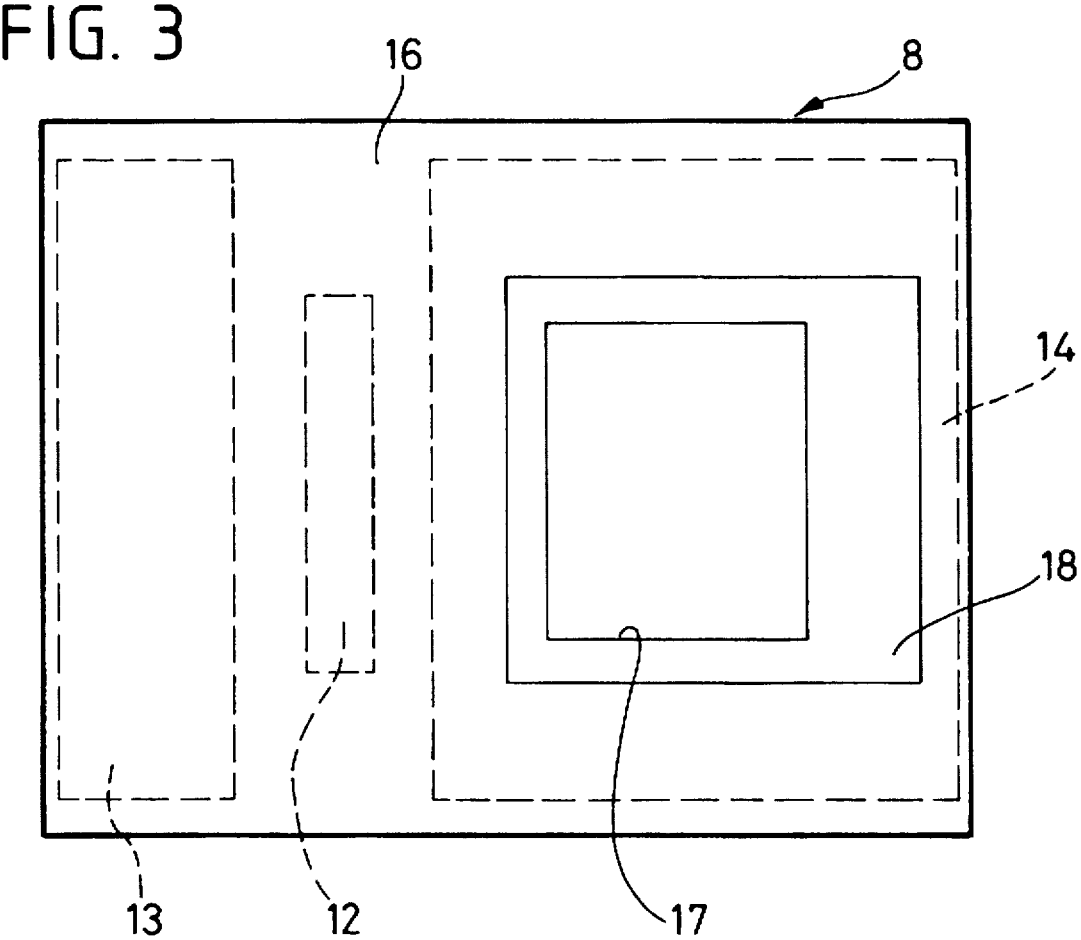
FIG. 3 shows a plan view of the weighing device from FIG. 2.

FIGS. 2 and 3 show the basic structure of the weighing device 8.

A weighing system, which essentially consists of a force transducer (weighing cell) 12, for example, in the form of a bending bar or a parallel rod with magnetic force compensation in a manner known per se and an electronic evaluation circuit 13, which will be described in further detail below, is disposed on a rigid scales stand 11. The weighing system is laterally offset on the scales stand 11 (to the left in FIGS. 2 and 3) to the extent that sufficient installation space remains on the right side of the scales stand 11 for a reading device 14, which is also securely connected to the scales stand 11.

The force transducer (bending bar) 12 is disposed with its underside fixed to scales stand 11. The upper side of the bending bar 12 is securely connected to the underside of a rigid support 15 made, for example, from cast aluminum, which, in turn, bears a conventional load plate 16, which is also represented diagrammatically in FIG. 1 and serves to receive the articles to be weighed. Owing to the previously mentioned largely off-center arrangement of the bending bar 12, which is intended to lie as far in the vicinity of the one edge (on the left in FIG. 2) of the support 15 and of the load plate 16 as permitted by the spatial requirement of the electronic evaluation circuit 13, the larger part (lying on the right in FIG. 2) of the support 15 and of the load plate 16 is supported cantilevered on the bending bar 12. The bending bar extends parallel to an edge, preferably parallel to the shorter edge of the load plate 16, if this is constructed as a rectangle.

As can best be seen from FIG. 3, the support 15 and the load plate 16 comprise windows 17 lying congruently over one another, which are covered by a radiolucent, in particular, transparent plate 18 made, for example, of glass, with the surface of the plate 18 being flush with the surface of the load plate 16. As the article may lie off-center on the load plate 16 in the operational state or weighing state, it exerts a twisting turning moment on the bending bar 12 supporting it around its longitudinal axis. This turning moment is eliminated by the parallel guidance of the bending bar and by an asymmetrical corner equalization which may be necessary, so that an electrical, weight-dependent signal is produced via wire strain gauges in a manner known per se, independently of an off-center load for further processing in an analog-to-digital converter 23 in the evaluation circuit 13.

In this way, one can manage with a single weighing cell, i.e., the bending bar 12, and, therefore, for example, the complicated temperature compensation of two such weighing cells is eliminated, and, secondly, the arrangement is compact and space-saving. Furthermore, the electronic evaluation circuit 13, as will be described later, contains all components required for the operation of a weighing device and so the described weighing device 8 can be calibrated as an independent unit and can be subjected in its entirety to an official authorization procedure.

As can also be seen from FIG. 2, adjusting screws 19 are provided at each corner on the scales stand 11 to enable a horizontal adjustment of the load plate 16—if necessary, with the aid of a spirit level, not illustrated. Furthermore, at each corner of the scales stand 11, columns 21 which act as overload stops for the load plate 16 protrude into the vicinity of the underside of the load plate 16. If the load plate is overloaded, in particular, at one of its corners, it is supported on one or more of the columns 21 and can not move any further. As a result, the bending bar 12, in particular, is protected from damage. The actual overload stops are formed by screws 22 provided at the upper ends of the columns 21 (FIG. 4) so the stops can be individually adjusted.

Figure 4:
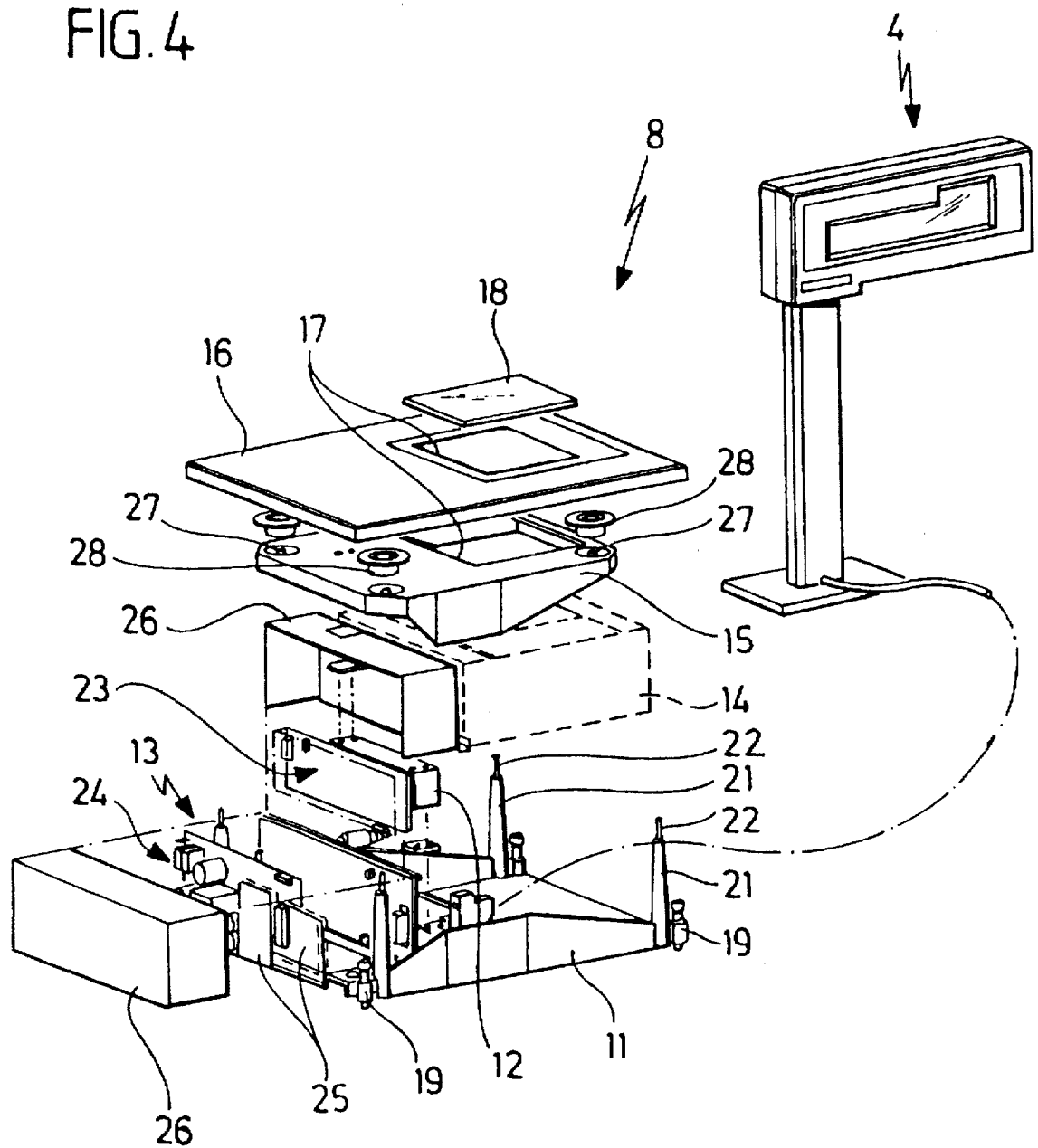
FIG. 4 shows an exploded view of the weighing device from FIGS. 2 and 3 with display device.

FIG. 4 shows a practical embodiment of the weighing device 8 with connected display 4. In FIG. 4 there is shown scales stand 11 with the adjusting screws 19 and the screws 22 of the column-type overload stops 21 and also the bending bar 12, the electronic evaluation circuit 13, and the reading device (scanner) 14, rigid support 15 is connected to the upper side of the bending bar 12 and the load plate 16 borne by the support 15, with the windows 17 covered by the plate 18 being formed on support 15 and load plate 16.

The electronic evaluation circuit 13 includes an analog-to-digital converter 23 and also a microcomputer 24 with power supply and also one or more interface circuits 25 known per se for the connection of further devices, preferably for connection to the point-of-sale terminal 3. This region is protected by partitions 26 against interfering influences and against unauthorized interference.

The rigid support 15 connected in cantilevered manner to the bending bar 12 comprises a journal 27 for the load plate 16 at each of its corners. Attached to the underside of the load plate 16 are four damping components 28 via which both the lateral attachment of the load plate 16 on the support 15 and the damping of impacts and oscillations are carried out.

One or more hydraulic dampers may also be provided in a known manner at the cantilevered edge of the support 15 (on the right in FIGS. 2, 3, 4) to assist the damping.

Figure 5:
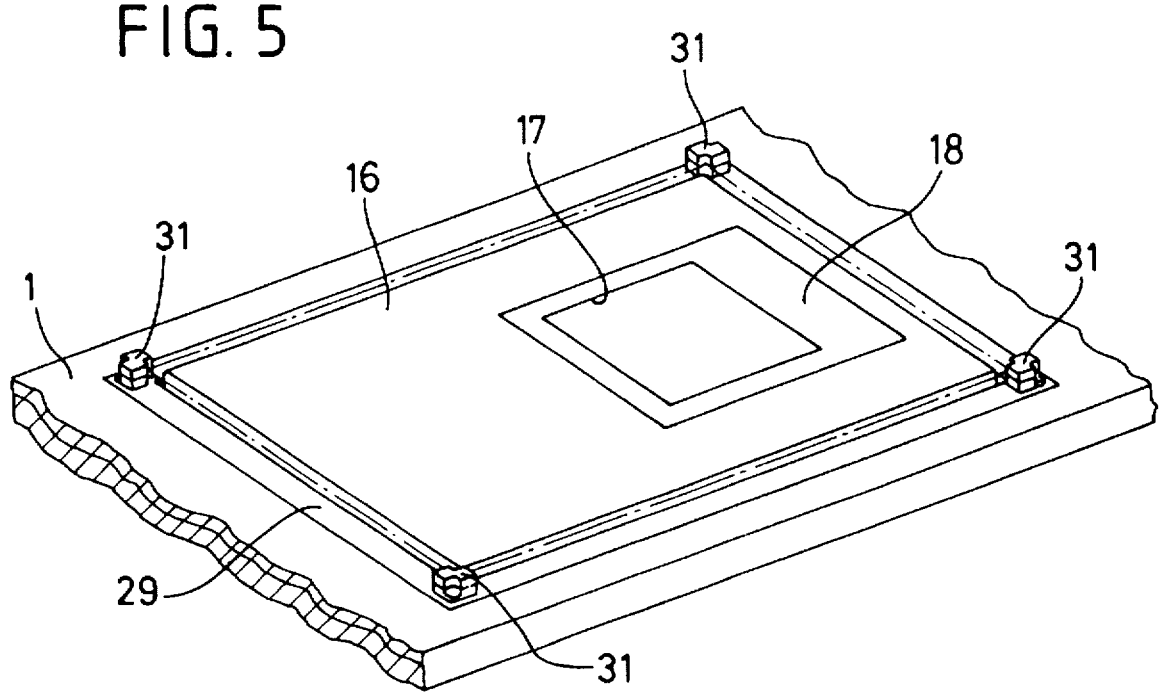
FIG. 5 shows a cash desk with installed load plate.

FIG. 5 shows the installation of the weighing device in the cash desk 1 of the central point-of-sale. The weighing device is adjusted by means of the aforementioned adjusting screws 19 (FIGS. 2 and 4) on a fixed base disposed beneath the cash desk 1 so that the load plate 16, on the one hand, lies horizontally and in the unloaded state has a slight projection of, for example, roughly 3 to 5 mm over the surface of the cash desk 1.

Sensors 31, which monitor the edges of the load plate 16, are installed at the corners of the load plate 16, preferably on a frame 29 encircling it with small clearance. When an article does not lie correctly and, therefore, touches the frame 29 or the cash desk 1, for example, i.e., protrudes laterally over the edge of the load plate 16, an error message is emitted via a corresponding circuit known per se, which may be integrated into the electronic evaluation circuit 13, and suppresses the display of the weight and the selling price of the article. The switching of the sensors 31 may also be performed so that the display is only ever enabled if the scales are loaded and none of the sensors 31 detects an object over an adjustable period of, for example, 500 msec. As a result, confusing values are prevented from appearing on the display 4 in the event of accidental contact with the load plate 16.

Figure 6:
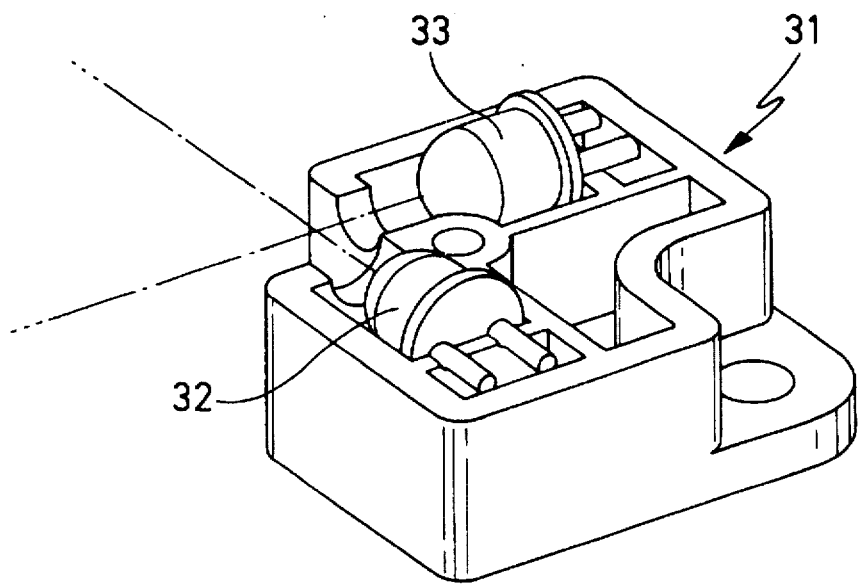
FIG. 6 shows a sensor for sensing the edges of the load plate from FIG. 5.

Optoelectronic components or components on ultrasound basis are preferably used for the sensors 31. In the preferred embodiment, sensors 31 are provided at all four corner points of the load plate 16. These—cf. FIG. 6—may consist of an infrared transmitting diode 32 and a receiver 33, e.g., a phototransistor. It is also sufficient to dispose such sensors 31 at just two corner points of the load plate 16. At each of the two other corner points a reflector is then provided to direct the beam emitted by a transmitting diode via a deflection angle of 90° to the nearest receiver.

The sensors 31 are installed in compact, sealed housings so that the rough operating conditions at the cash desk 1 and the cleaning work required at regular intervals on the cash desk do not represent a problem. The evaluation circuit is of intrinsically safe design and so an error message occurs in the event of failure of structural members or very severe soiling.

The electronic evaluation circuit 13 represented and described herein performs all functions required for a modern weighing device, i.e., in particular, the weight and price calculation of an item laid on the load plate 16, with the price calculation being performed on the basis of the ascertained weight and an associated basic price of the article detected, e.g., via the aforementioned reading device 14.

The electronic evaluation circuit 13 may, however, also contain components in a manner known per se, with the help of which spurious oscillations, as are produced, in particular, by building oscillations or when laying the article on the load plate 16, are filtered out. The "stabilization period" of the weighing device is thereby shortened. This results in a faster display of the weight and price.

Figure 7:
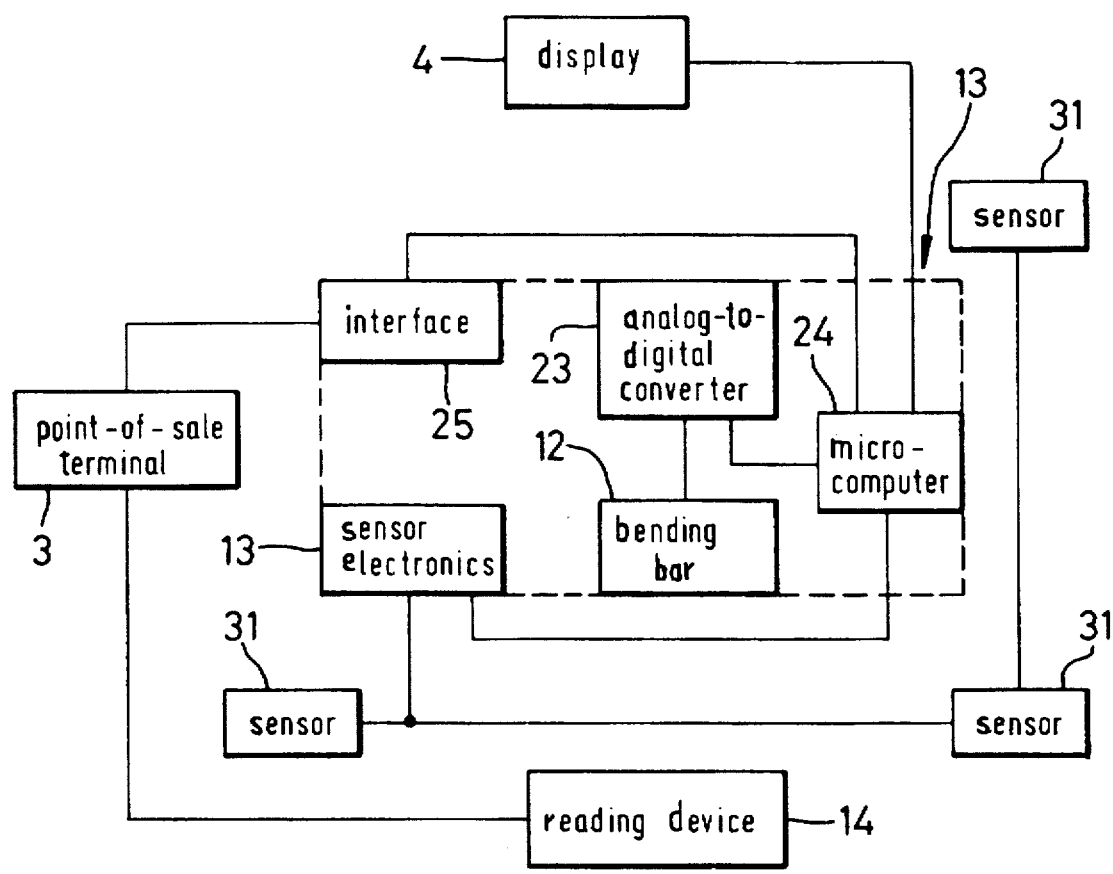
FIG. 7 shows a block diagram of the weighing device.

FIG. 7 shows a block diagram of the weighing device which can be understood on its own merits.

The reading device 14 installed in the weighing device 8 will normally be a so-called "scanner" for the optical scanning of a bar code. However, other reading devices are also possible, in particular, to detect other codes, for example, a CCD camera, with CCD meaning "charge coupled device".

In a further embodiment of the weighing device described, a lifting device (not shown) for raising the load plate 16 above the cash desk 1 may also be provided between the rigid support 15 and the load plate 16. It is thereby possible to raise the surface of the load plate 16, for example, to 15 mm or more above the cash desk, so that even long articles which protrude laterally over the load plate 16 do not lie on the cash desk, and the weighing operation is not interfered with. Of course, in this case, the sensors 31 have to be switched off.

We claim:

1. An electronic checkout system for weighing and scanning articles including in combination:

a support cradle having a first side and a spaced-apart, opposite second side;

a scanner disposed on said support cradle adjacent said first side;

an electronic circuit, including means for determining the price of articles being weighed, disposed on said support cradle adjacent said second side;

a single weighing cell secured to said support cradle between said scanner and said electronic circuit, said single weighing cell being disposed closer to said second side than said first side and providing an output to said electronic circuit; and a rigid subplatter, having an aperture formed therethrough, supported solely on said single weighing cell and extending toward said first side such that said aperture overlies said scanner.

2. The checkout system of claim 1, wherein said determining means comprises a microprocessor and an analog-to-digital converter.

3. The checkout system of claim 1, wherein said weighing cell comprises a cantilever beam.

4. The checkout system of claim 1, further comprising:

a weighing tray having a periphery and disposed on said subplatter; and means for detecting when an article placed on said weighing tray extends beyond the periphery.

5. The checkout system of claim 1, wherein said scanner comprises a CCD camera.

6. The checkout system of claim 1, additionally comprising a weighing tray disposed on said subplatter; and means for damping oscillations between said weighing tray and said subplatter.

7. The checkout system of claim 6, wherein said damping means comprises means for supporting said weighing tray on said subplatter.

8. The checkout system of claim 1, further comprising a hydraulic damper coupled to a portion of said subplatter adjacent said first side.

9. The checkout system of claim 1, wherein said electronic circuit includes means for filtering out spurious oscillations during weighing.

10. The checkout system of claim 1 additionally comprising a checkout station having an upper surface and an opening for receiving said support cradle; and a weighing tray having a periphery, said weighing tray being disposed on said subplatter and protruding slightly above said upper surface when unladen.

11. The checkout system of claim 10, further comprising means disposed between said subplatter and said weighing tray for selectively raising said weighing tray.

12. The checkout system of claim 11, additionally comprising means for detecting when an article placed on said weighing tray extends beyond the platter periphery.

13. The checkout system of claim 12, further comprising means for disabling said detecting means when said weighing tray is raised.

14. The checkout system of claim 12, additionally comprising means for displaying the price of articles being weighed, wherein said electronic circuit comprises means for disabling said displaying means when an article on said weighing tray is detected by said detecting means.

* * * * *